(12) United States Patent
Gabrys

(10) Patent No.: US 7,352,076 B1
(45) Date of Patent: Apr. 1, 2008

(54) SMALL WIND TURBINE SYSTEM

(75) Inventor: Christopher W. Gabrys, Reno, NV (US)

(73) Assignee: Mariah Power Inc., Reno, NV (US)

( * ) Notice: Subject to any disclaimer, the term of this patent is extended or adjusted under 35 U.S.C. 154(b) by 12 days.

(21) Appl. No.: 11/502,683

(22) Filed: Aug. 11, 2006

(51) Int. Cl.
*H02P 9/04* (2006.01)
*F03D 9/00* (2006.01)

(52) U.S. Cl. .......................................... 290/44; 290/55
(58) Field of Classification Search ................. 290/44
See application file for complete search history.

(56) References Cited

U.S. PATENT DOCUMENTS

| | | | | |
|---|---|---|---|---|
| 4,355,956 | A | * | 10/1982 | Ringrose et al. ......... 416/132 B |
| 4,427,897 | A | * | 1/1984 | Migliori ..................... 290/44 |
| 4,430,044 | A | * | 2/1984 | Liljegren ................... 416/119 |
| 4,525,633 | A | | 6/1985 | Wertheim ................... 290/44 |
| 4,695,736 | A | | 9/1987 | Doman et al. .............. 290/44 |
| 5,252,029 | A | * | 10/1993 | Barnes ...................... 416/142 |
| 5,793,625 | A | | 8/1998 | Balogh ...................... 363/89 |
| 6,703,718 | B2 | | 3/2004 | Calley et al. ............... 290/44 |
| 6,836,028 | B2 | * | 12/2004 | Northrup et al. ........... 290/44 |
| 6,966,747 | B2 | * | 11/2005 | Taylor et al. ............... 415/1 |
| 7,189,050 | B2 | | 3/2007 | Taylor et al. ............... 415/1 |
| 2004/0061337 | A1 | * | 4/2004 | Becker ....................... 290/44 |
| 2007/0138798 | A1 | * | 6/2007 | McClintic .................. 290/44 |

FOREIGN PATENT DOCUMENTS

GB 1600243 A * 10/1981

* cited by examiner

*Primary Examiner*—Josep Waks
(74) *Attorney, Agent, or Firm*—J. Michael Neary

(57) ABSTRACT

A small wind-powered electricity generation system, providing regulated AC electric power from wind energy to a power system grid, has a wind turbine that produces less than 10 kW of peak electric power in a permanent magnet generator that produces generator power with a frequency that varies with the wind speed. The wind turbine utilizes a cross-wind type rotor having a power coefficient that varies with the operating tip speed ratio and has an optimal tip speed ratio wherein the power coefficient is maximum. A power converter, for converting generator power to regulated electric power by applying a controlled load to the generator controls the operation of the wind turbine rotor such that the operating tip speed ratio is greater than the optimal tip speed ratio in a low wind speed region, is approximately equal to the optimal tip speed ratio in a medium wind speed region, and is greater than the optimal tip speed ratio in a high wind speed region.

20 Claims, 8 Drawing Sheets

SMALL WIND TURBINE SYSTEM

This invention pertains to a wind turbine system for providing regulated AC power from a low cost small wind turbine to a power system grid, and more particularly to a wind turbine system that increases the annual energy delivery while also having a reliable construction and operation and low cost.

BACKGROUND OF THE INVENTION

Use of wind turbines for electrical energy generation is currently growing because of their economical power production and environmental benefits, and because of the growing realization that other sources of energy are limited. Large wind turbines, located in off shore or remote wind farms are increasingly being installed worldwide. They can produce megawatts of electric power with lower costs than many other types of power production, and they do not pollute.

Another application for wind turbines is in small wind turbines, typically of 10 kilowatts peak power or less. Such small wind turbines have been deployed on farms for providing some electricity production, but their use has generally been limited because of certain deficiencies. An additional emerging market opportunity for small wind turbines is in urban and suburban installations. In these installations, customers expect to be able to produce some of their own electric power and offset their utility bills through net metering. Urban and suburban wind turbines will be located where people live, with installations on rooftops, in yards and along roadsides. They will reduce electricity transmission losses and the need for additional transmission lines.

Unfortunately, small wind turbines currently suffer from substantial deficiencies that limit their use and are preventing their widespread adoption. Small wind turbines are currently much too expensive for the energy that they produce. They have less than ideal energy capture, conversion and efficiency. They typically employ complex and costly constructions. Most small wind turbines are also noisy and require the use of towers that are unsightly and difficult to zone and install, both limiting their suitability for urban and suburban installations. Other deficiencies include rotor turbulence sensitivity, overspeed structural failure potential and avian-unfriendliness. Accordingly, a new type of small wind turbine system is needed.

SUMMARY OF THE INVENTION

The invention provides a small wind turbine system that delivers regulated AC power to a power system grid at reduced costs and increased annual energy production while having very desirable wind turbine operating characteristics. The system uses a low tip speed ratio cross-wind type or drag propelled turbine with peak capacity of less than 10 kilowatts. Unlike horizontal propeller small wind turbines, the drag propelled configuration operates in cross winds and with a low tip speed ratio under 3.0 for silent operation. The tip speed ratio is the ratio of the speed of the rotor tip divided by the speed of the wind. The turbine has robust construction and low construction costs, and does not need pitch speed control. The wind turbine directly drives a permanent magnet generator for high efficiency at low weight and costs. The generator has no field coil and therefore provides for no voltage regulation from field coil control. Instead, a power converter converts the generator power to regulated AC electric power by applying a controlled load to the generator power. The system maximizes the energy production to the grid from the wind turbine and generator and also provides for desirable turbine operation. In accordance with the invention, the power converter utilizes three operating regions including a low wind speed region, a medium wind speed region and a high wind speed region. The power converter provides no power to the power system grid in the low wind speed region. The power converter provides power with an increasing function of the turbine rotational speed in the medium wind speed region. In the high wind speed region, the power converter provides output power with variations of turbine rotational speed by increasing the rotor operating tip speed ratio above the operating tip speed ratio in the medium wind speed region.

This operational method is unlike that of conventional turbines. Conventional turbines are controlled to decrease their operating tip speed ratio in high winds. Also, the power converter of conventional small wind turbine systems applies load to the generator that continues increasing the rotor operating tip speed ratio with increasing wind speeds.

Because wind turbines in accordance with this invention use a low tip speed ratio, cross-wind turbine rotor, affording the advantages of low cost and low noise, the rotor does not offer the ability to yaw or furl out of the wind like a conventional propeller type wind turbine. As a result, the speed cannot be controlled through rotor direction and will increase in increasing wind. Moreover, no pitch control of the rotor blades is available to limit speed, although speed control could be maintained by overloading the rotor in high winds. However, it has been surprisingly found that low tip speed ratio rotors can be constructed such that the rotor speed need not be limited for structural safety. In operation, contrary to conventional turbine operation, the wind turbine system of this invention utilizes no active stalling. Even in extreme wind speeds of more than 35 m/sec, the rotor will not have failure from stress induced in operation at high rotational speed. The stress of a given rotor is a squared function of its tip speed. A drag-propelled rotor in accordance with this invention operates with a tip speed ratio of about 1.2 whereas a conventional turbine rotor operates with a tip speed ratio of about 7.0-10.0. Accordingly, the stress in the drag-propelled rotor can be more than 34 times lower and can be economically designed to survive high winds. Speed regulation of the rotor is not required, allowing instead just the use of over voltage prevention of the generator and power converter, as generator voltage increases linearly with rotor speed and wind speed.

A further advantage of the construction is that, without the need to control rotor speed through pitch control or stalling, the turbine construction is simplified and noise is also further reduced. Conventional small wind turbines with speed regulation through stalling are very noisy and not compatible for urban and suburban installation where their noise would be unacceptable. The stall control also puts high stresses on the mechanical system and it requires the inverter electronics to be oversized, adding undesirable costs. An additional cost savings is also provided by eliminating the need for an energy diversion load. When a conventional turbine is operated in high wind, the rotor is slowed and driven to a lower operating tip speed ratio by dumping excess energy into a diversion. To allow operation in high wind areas, the diversion load can be large and costly. In contrast, the small wind turbine system in accordance with this invention requires no diversion load. When operated in high wind, the rotor is driven to higher operating tip speed ratios, and no energy needs to be dumped into a diversion load. This reduces the costs of the wind turbine system and eliminates the need to remove unnecessary heat.

In a preferred embodiment, the power converter applies a cubically varying load with rotor rotational speed to the generator in the medium wind speed region. This power extraction is more complex than a linear interpolation applied by current permanent magnet generator driven grid tie inverter wind turbine systems. Because the power of the wind varies with the cube of the wind speed, the wind generator with this preferred power converter can extract the maximum potential energy from the wind. The wind turbine rotor has a power coefficient for energy extraction from wind that varies with the tip speed ratio of the rotor. Preferably, in the medium wind speed region, the power converter applies load to the generator in accordance with the rotor and generator designs so as to maintain the rotor operating tip speed approximately equal to the tip speed ratio corresponding to the maximum rotor power coefficient. This can be accomplished by the power converter controlling the load through detection of the generator voltage level or through detection of the generator or rotor frequency.

In the high wind region, the power converter can provide a substantially constant output power. It allows the operating tip speed ratio to increase above the tip speed ratio corresponding to the maximum rotor power coefficient by reducing the load to the generator.

In an additional embodiment, the power converter includes a fourth region for extreme wind speeds. In the extreme wind speed region, the system disconnects the generator power from the power converter to prevent over voltage damage that could occur. The wind turbine system has an extremely wide voltage range of the generator output to the inverter. If power production begins at 4 m/sec and the highest expected wind speed is 35 m/sec, this results in a more than 8:1 voltage range. A consequence of the large range is the production of very high voltages in high winds that have potential to cause electronics failure. The fourth region maintains the functioning of the wind turbine system despite the occurrence of an unusually high velocity storm. Disconnection of a load to a conventional wind turbine system would be contrary to the teachings in the art, as it would cause a conventional wind turbine to fail. The combination of a properly designed low tip speed rotor with the control prevents failure. Disconnection of the load allows the rotor to rotate even faster and the generator to produce higher voltage.

Several features can be included in the small wind turbine system to reduce total costs. Depending on the wind turbine system, it can be desirable to utilize high voltage (1200 volt) transistors for the power converter to allow for high voltage swing and a wide range of wind speeds for power generation. Alternatively, a wye to delta control can be added to limit the voltage to the power converter to 600 volts. The wye to delta control switches the 3-phase power connection of the generator to limit the voltage when it gets to a predetermined limit. Switching the connection reduces the voltage by a factor of 1.73. The control can be operated by sensing the phase winding voltage or alternatively by sensing the generator frequency. The control can be included inside the generator to limit the high voltage, greater than 600 volts, from needed connection to an external power converter. If a wye to delta converter is utilized, the power converter control can be operated utilizing the generator frequency instead of the rectified generator voltage level.

In a preferred configuration the power converter switches between the low wind speed region and medium wind speed region at wind speeds between 3-6 m/sec. The power converter further preferably switches between the medium wind speed region to high wind speed region at wind speeds between 10 and 13 m/sec. This configuration provides good energy capture and low costs for Class 3 and Class 4 wind speeds, and it is compatible with the majority of locations.

The generator voltage can be chosen to reduce the costs of the power converter. A typical converter consists of a boost-buck converter that boosts the incoming generator voltage and then forms regulated AC output for grid tied connection. In the simplest form, the power converter consists of a rectifier that rectifies the generator voltage and an inverter that generates grid tie AC output power. The costs of the inverter can be reduced and efficiency increased by eliminating the need for a boosting stage. This simplifies the construction and reduces parts and operating losses. The generator must provide a voltage, at the lowest generating wind speeds that can be directly switched into AC utility power. The generator is designed to provide a rectified voltage that is greater than the peak voltage of the power system grid whenever the wind turbine is operating in the medium wind speed region.

The inverter can utilize analog electronics to control the load that is applied to the generator according to the rotor speed and wind speed. Alternatively, the power converter controls the load to the generator using a digital signal processor that varies said load accordingly with the rotational speed of the rotor. One advantage of the use of a DSP for the control is exact adjustment of the operation can be achieved. If a power converter is sold with different sized rotors or with rotors that are installed in different wind regimes, it may be desirable to set the operating parameters on site. In an additional preferred embodiment the power converter includes an adjustment for manually setting the operating parameters of the rotor.

The generator for the wind turbine system converts the rotational energy from the rotor into electrical energy. A permanent magnet generator provides the power conversion with high efficiency and compact size, but does not include a field coil that would allow for field coil voltage control. Because a drag propelled rotor can have directions of wind approach that do not provide high torque, it is desirable that the rotor and generator rotate freely so as to be self-starting regardless of the wind speed or direction. Permanent magnet generators utilizing NdFeB magnets can have significant cogging torque that locks the rotor in place when not rotating and prevents easy starting of rotation. Conventional permanent magnet generators also suffer from magnetic induced losses, eddy currents and hysteresis. Further, conventional permanent magnet generators also exert a high rotor to stator magnetic attraction that requires multiple bearings and a heavy rigid structure to resist. As a consequence, the preferred generator for the wind turbine system is a double rotating air core construction. This type of generator construction avoids these deficiencies. Preferably, the permanent magnet generator is directly driven by the rotor at the same rotational speed and comprises two spaced apart co-rotating generator rotors forming therebetween an armature airgap. The permanent magnets are located on the generator rotors and drive magnetic flux across the armature airgap. Located within the armature airgap are multiple generator windings for producing power. The windings are preferably constructed into a substantially non-magnetic structure to eliminate magnetic attraction and magnetically induced losses. The air core construction allows the turbine to begin rotating and energy capture in the lowest of winds. It further eliminates generator noise or vibration.

Cross-wind turbines generate power from wind coming from many angles and not just head-on as in a propeller turbine that requires a yaw mechanism for correct wind tracking. Because a cross-wind turbine does not need to track wind direction changes, it can generate more energy in turbulent winds. Low tip speed ratio cross-wind turbine rotors in accordance with the invention can be constructed by several different designs. One design is the traditional Savonius rotor that relies primarily on drag. Another type is a modified Savonius, which has a modified rotor profile to utilize lift for torque generation at some rotational angles and utilizes drag at other angles. New versions or multi bladed turbines are also being constructed and could be utilized with the wind turbine system so long as they operate with a maximum tip speed ratio of below 3.0 and were structurally sound.

DESCRIPTION OF THE PREFERRED EMBODIMENT

Figure 1:
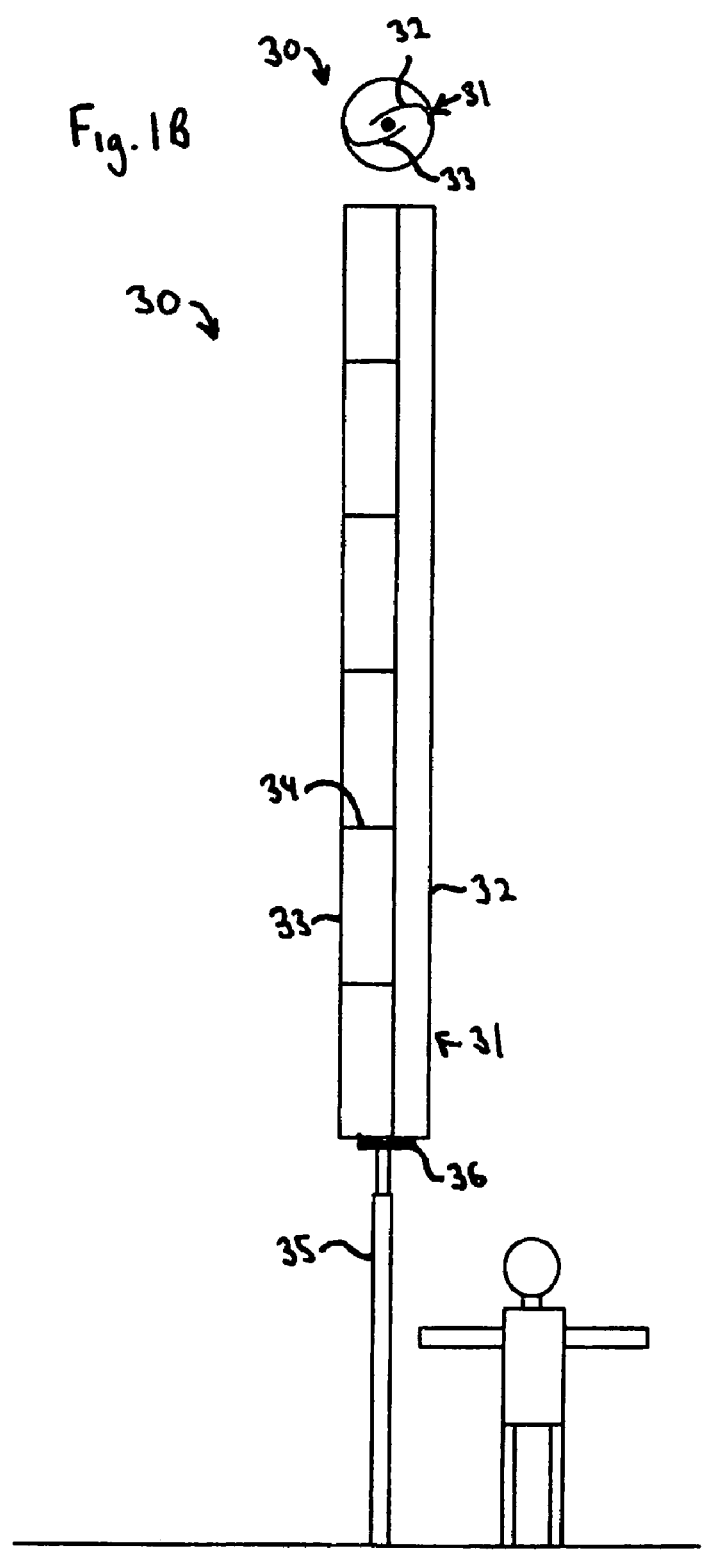
FIG. 1A is a schematic elevation of a wind turbine for use in a small wind turbine system in accordance with the invention.
FIG. 1B is a schematic plan view of the wind turbine shown in FIG. 1A.
Figure 13:
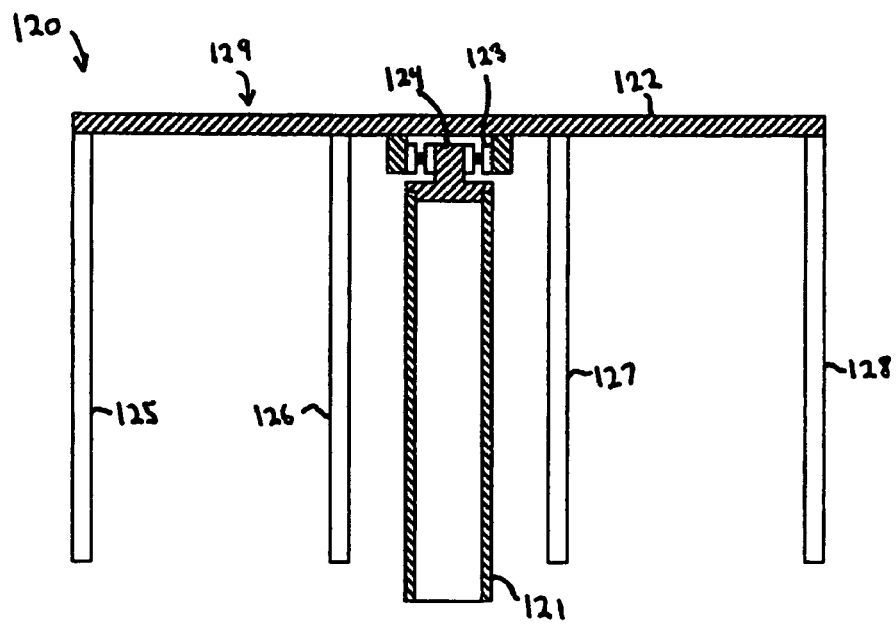
FIG. 13 is a schematic elevation of the top end of a wind turbine in a small wind turbine system in accordance with the invention.
Figure 14:
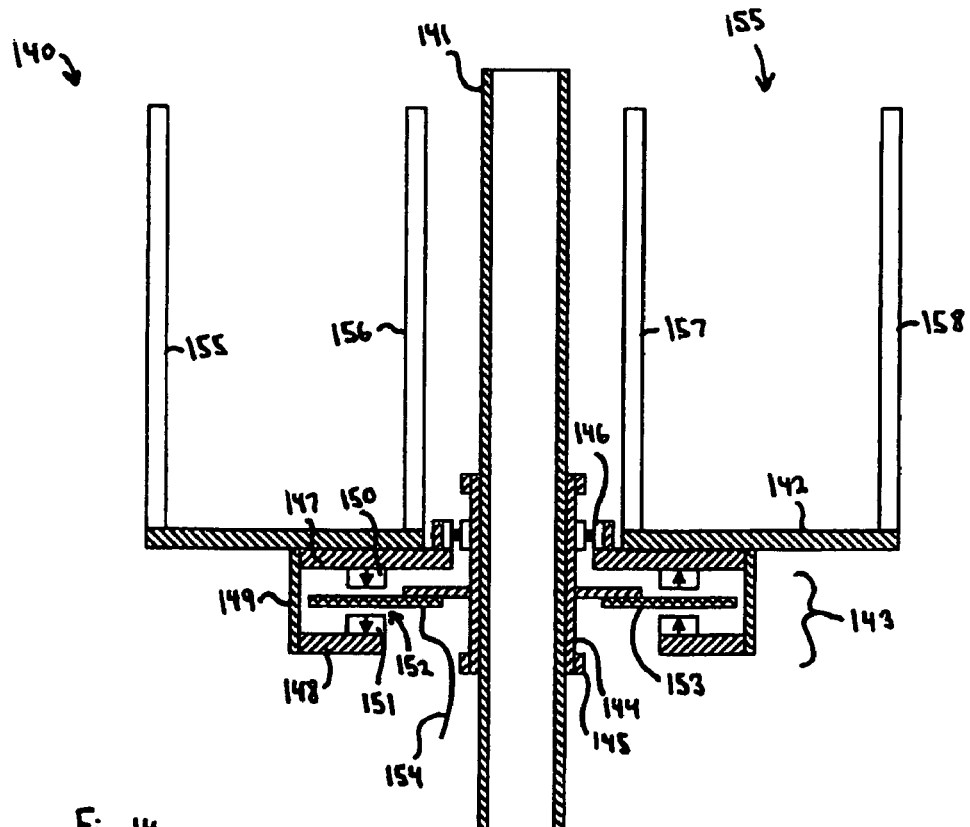
FIG. 14 is a schematic elevation of the bottom end of a wind turbine in a small wind turbine system in accordance with the invention.

Turning to the drawings, wherein like reference characters designate identical or corresponding parts, FIGS. 1A and 1B shows a wind turbine 30 for use in a small wind turbine system in accordance with the invention. The wind turbine 30 includes a drag-propelled rotor 31 that is driven by the drag force of the wind. The rotor 31 is constructed from two curved blades 32, 33 that catch the wind to self-start. Radial rib members 34 reinforce the blades 32, 33 to hold the desired curved profile and to increase the bending stiffness and centrifugal structural strength of the rotor 31. The rotor 31 is journalled for rotation about a vertical axis pole 35 and captures wind energy from any direction, without the need for a tower. The rotor 31 drives a permanent magnet generator 36 that converts the rotation energy into unregulated generator power. One embodiment of a suitable wind turbine is shown in FIGS. 13 and 14 and is described in more detail below.

Figure 2:
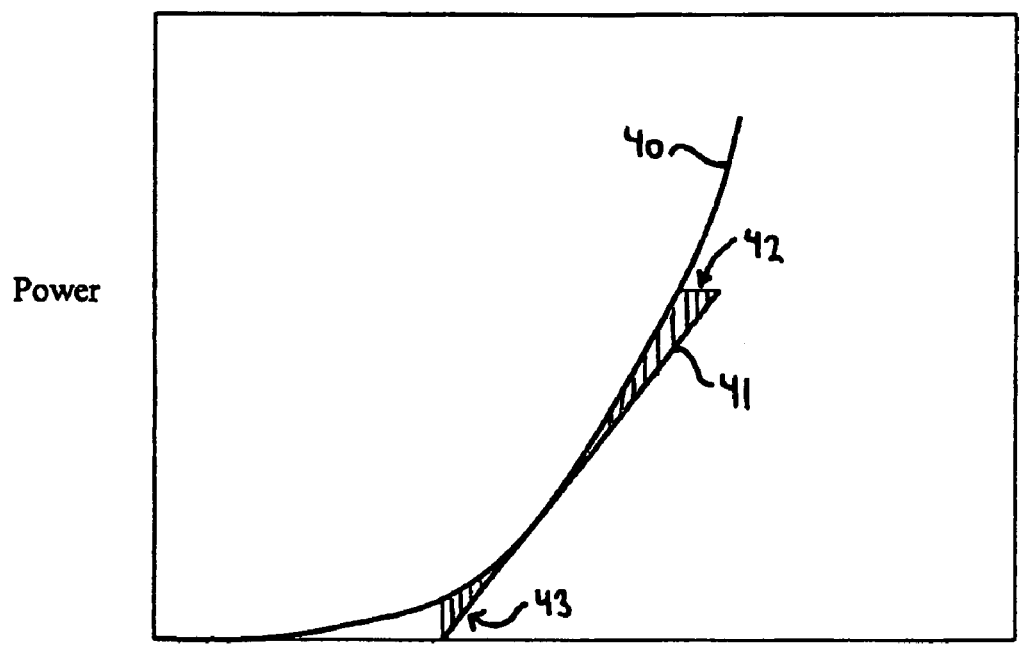
FIG. 2 is a plot of power versus wind speed along with a power extraction interpolation of prior art.

A plot of power versus wind speed along with a power extraction interpolation of prior art is shown in FIG. 2. As shown in curve 40, wind power is a cubic function of the speed of the wind. Efficient capture of the energy of the wind at the higher wind speeds in a given wind speed regime is significantly more important than capture of low speed wind to the costs per annual energy generation of the small wind turbine system. The wind energy extraction from a conventional small wind turbine inverter for use with a permanent magnet generator wind turbine is a linear interpolation, indicated by the line 41. The system is very simple to implement because the inverter duty cycle for switching load power to the generator is a direct linear function of the generator voltage. Unfortunately, when no stall or pitch control mechanism is utilized in the small wind turbine, such as a Savonius type, significant wind energy in the operating speed range is lost. Energy at the lower range end 43 and energy at the upper range end 42, as illustrated in the divergence between line 41 and curve 40, is not captured, which substantially affects the costs per annual energy generation of the small wind turbine system.

Figure 3:
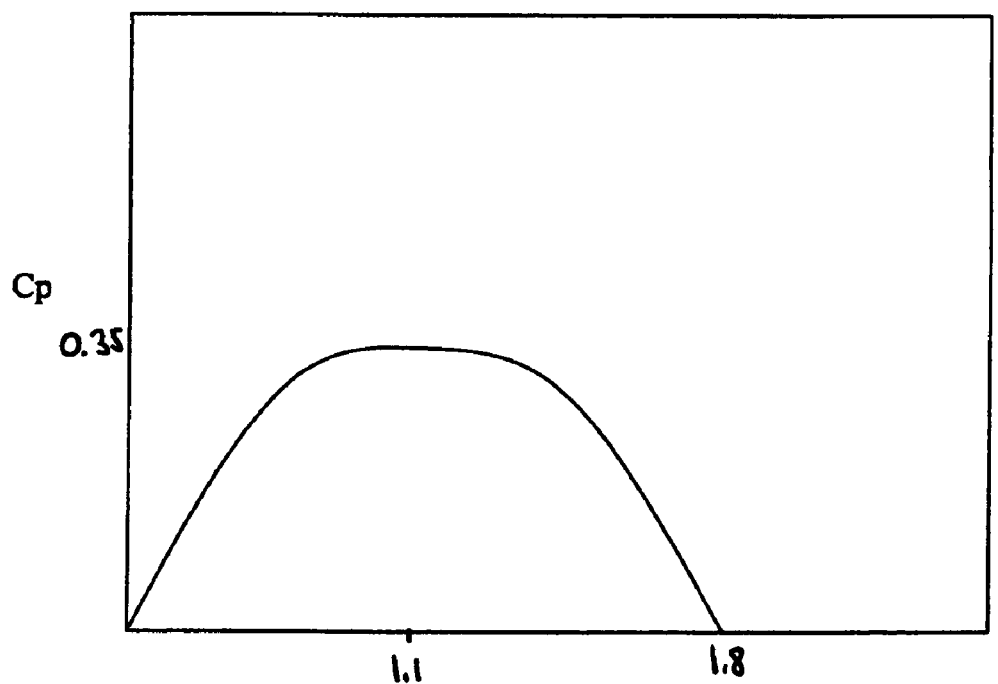
FIG. 3 is a plot of power coefficient versus tip speed ratio for a small wind turbine system in accordance with the invention.

A plot of power coefficient versus tip speed ratio for a small wind turbine system in accordance with the invention is shown in FIG. 3. Power coefficient is the percent of wind energy acting on the rotor that is actually captured by the rotor. A drag propelled wind turbine provides the benefits of capturing energy from any direction of wind utilizing a vertical axis, reduced sensitivity from turbulence induced from nearby structures without the use of a tower, and operates at a low tip speed ratio for low noise operation. The baseline drag propelled turbine rotor is the Savonius wind turbine. It utilizes two semicircular cup blades to catch the wind and has a peak power coefficient that occurs around 0.8 tip speed ratio. New modifications of the blade profile from semicircular to airfoil-contoured shape have increased the power coefficient and tip speed ratio. These increases have come with the addition of wind-induced lift contribution to the drag contributions that drive the rotor. As shown, the power coefficient of the rotor has a peak in the middle of its operating tip speed ratio range. With no inverter load applied to the generator, the rotor speed increases and operates at a no load tip speed ratio of about 1.8. The peak power coefficient, or peak percent of wind energy captured by the rotor per available wind energy acting on the rotor, occurs at tip speeds of between about 0.8 to about 1.3. The higher the tip operating tip speed ratio and power coefficient the lower the costs for the generator and turbine rotor to provide a given level of energy generation.

Figure 4:
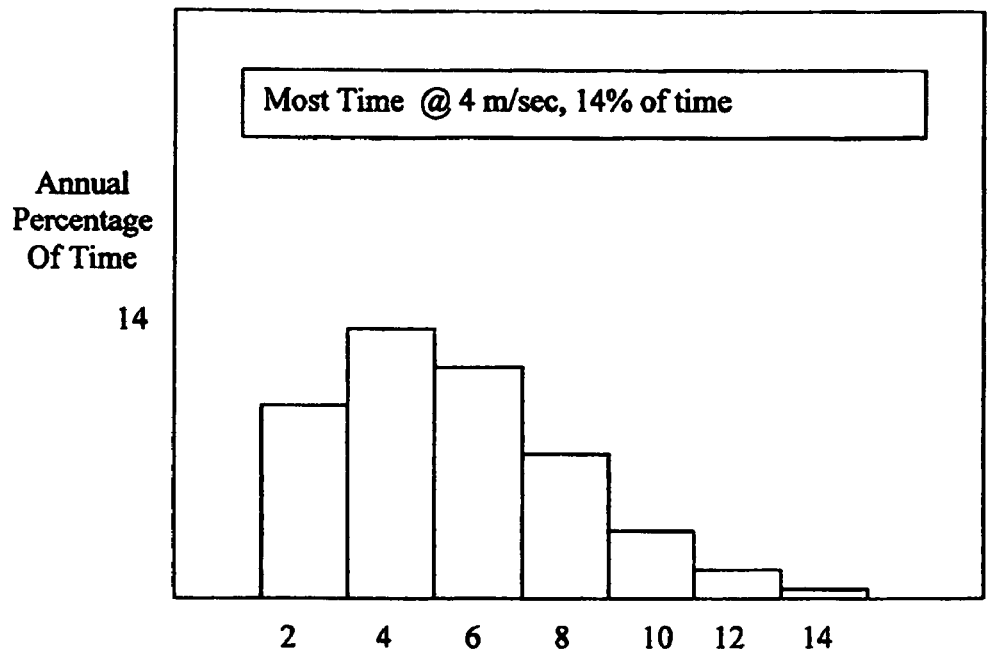
FIG. 4 is a graph of annual percentage of time for given wind speeds in a Class 3 wind regime.

A graph of annual percentage of time for given wind speeds in a Class 3 wind regime is shown in FIG. 4. The average wind speed is 5.35 m/sec in this regime. However, the wind speed that occurs most often by time is about only 4 m/sec, at about 14% of the time. This would suggest that capturing the energy at low wind speeds is critical. However, the power available from the wind is a cubic function of the speed of the wind.

Figure 5:
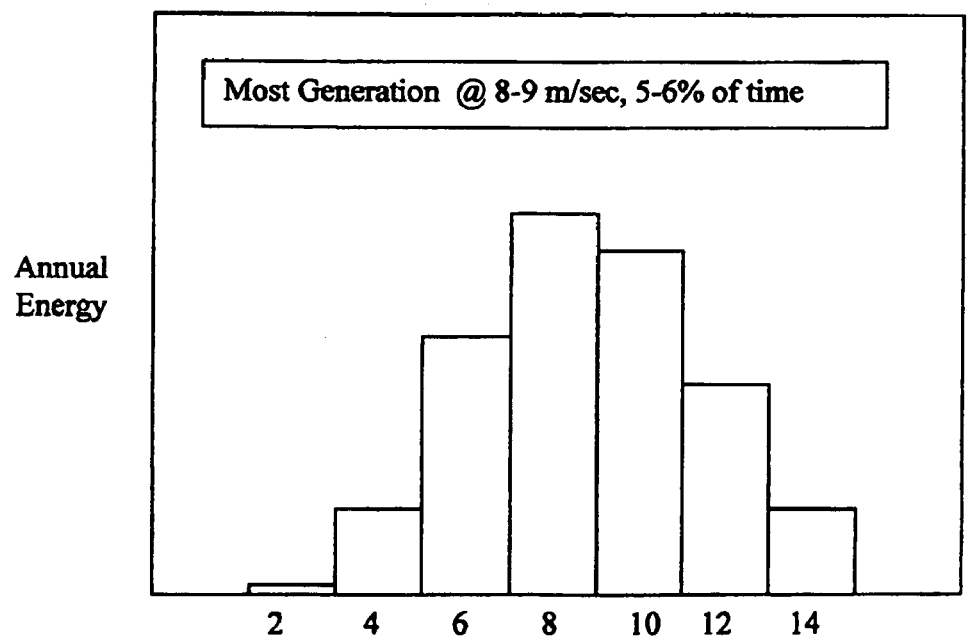
FIG. 5 is a graph of annual energy available for given wind speeds in a Class 3 wind regime.

The available wind energy is made apparent by plotting the wind energy distribution. A graph of annual energy available for given wind speeds in a Class 3 wind regime is shown in FIG. 5. Looking at the annual energy generation distribution, which will directly affect the energy generation costs of the small wind turbine system, the more important wind speeds for power generation is shifted to the higher wind speeds. The greatest energy generation potential occurs at the wind speeds between 8-9 m/sec. This is despite the fact that they occur only 5-6% of the time.

Figure 6:
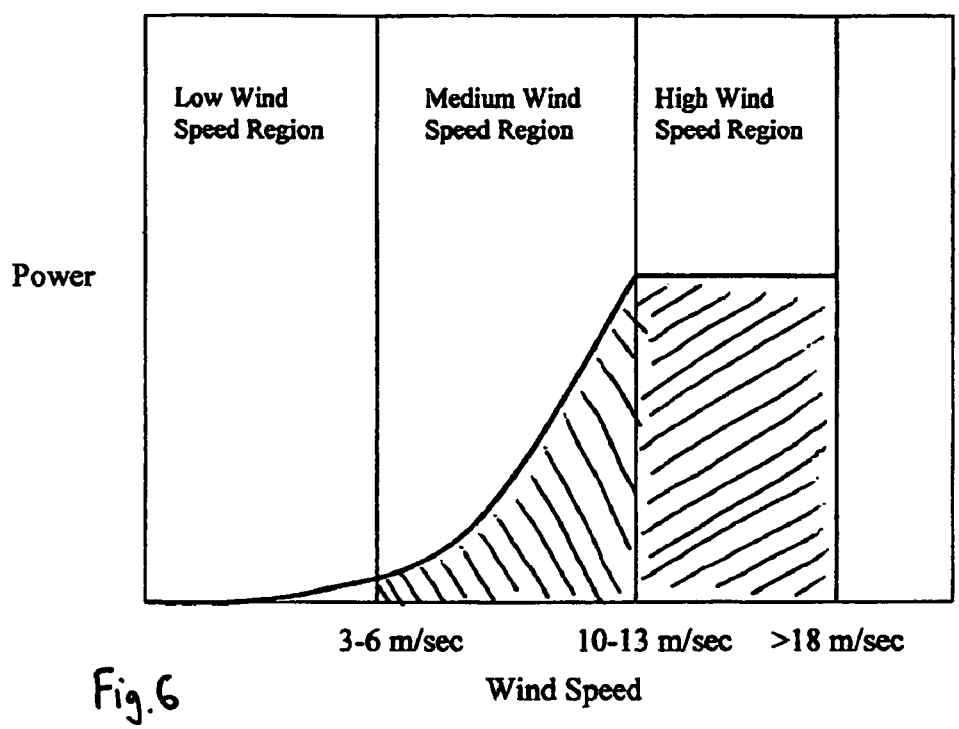
FIG. 6 is plot of power extraction for a small wind turbine system in accordance with the invention.

A plot of power extraction for a small wind turbine system in accordance with the invention is shown in FIG. 6. A power converter of a power system for use in a small wind turbine system, shown in FIG. 10 and described in detail below, converts the varying generator power to regulated AC electric power by applying a controlled load to the generator. The power converter utilizes three operating regions including a low wind speed region, a medium wind speed region and a high wind speed region. The power converter provides no power to the power system grid in the low wind speed region. These wind speeds are below the level that provides significant wind energy, and to extract power from this low wind would require undesirably increased generator costs. Because of the simple turbine design, pitch control is not available to increase the generator speed in the low wind speed region.

The power converter provides power with a nonlinear increasing function of the turbine rotational speed in the medium wind speed region. As the wind energy increases, the turbine speed and generator voltage increase linearly with the wind speed. The converter utilizes a nonlinear interpolation, preferably a cubic function of the wind speed, to capture most of the available wind energy. The use of the nonlinear function can maintain the rotor operating tip speed ratio such that the rotor power coefficient is near the maximum value in the medium wind speed range.

In the high wind speed region, the power converter provides constant output power with variations of turbine rotational speed by increasing the rotor operating tip speed ratio above the operating tip speed ratio in the medium wind speed region. Although more wind energy is available than is being collected in the high wind speed region, collection of additional energy would adversely affect the small wind turbine costs per annual energy generation. To collect more energy in the high wind speed region would require undesirably increased inverter costs.

The wind turbine system may also include a fourth or extreme wind speed region. Because the rotor is drag propelled, it does not effectively stall to limit speed. Little danger is present from rotor structural failure because a drag propelled rotor operates at a tip speed ratio of about $1/7^{th}$ a conventional wind turbine, and stress are proportional to the square of the tip speed for a given design structure. However, the wind turbine system can be damaged by over voltage to the power converter. In the extreme wind speed region, generator power can be disconnected from the power converter in the rare occurrence of extreme wind storms.

Figure 7:
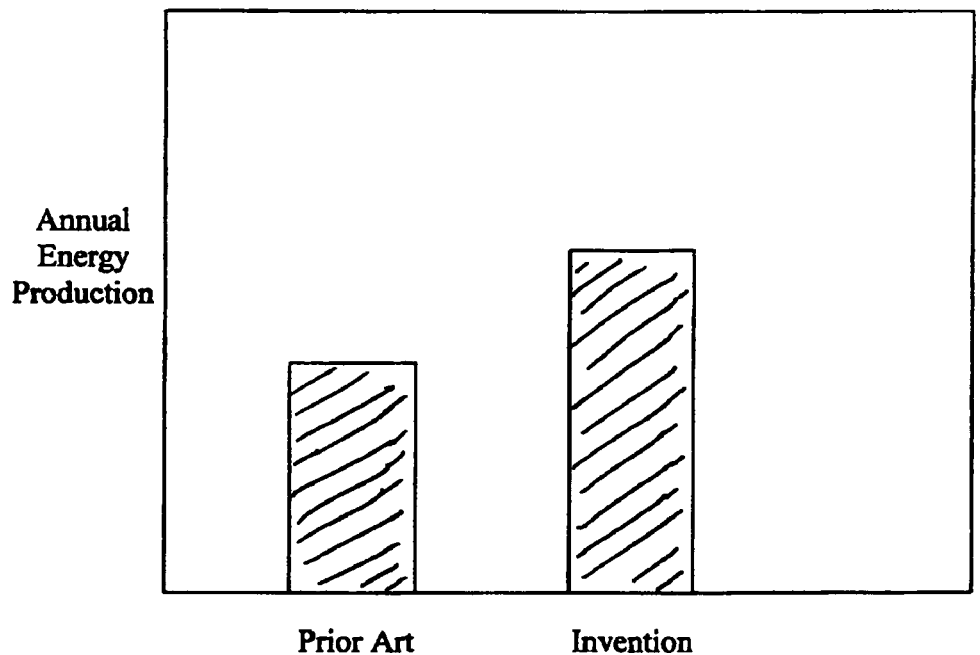
FIG. 7 is graph comparing annual energy generation using prior art wind turbines with what it could be using wind turbines in accordance with the invention.

A comparison of potential annual energy generation between the invention and prior art is shown in FIG. 7. The small wind turbine system can provide as much as 30% increased annual energy generation over a current conventional horizontal propeller wind turbine with permanent magnet generator and conventional voltage controlled inverter. The small wind turbine system also has lower initial costs resulting from the simpler construction and elimination of a requirement for a tower, thus substantially reducing the costs per annual energy generation of the system. The small wind turbine system also is quiet and avian friendly in operation.

Unlike conventional small wind turbine systems employing horizontal axis, high tip speed ratio propellers, a drag propelled wind turbine provides regulation for different reasons. Over voltage protection is the reason for regulation instead of structural integrity, which requires the conventional turbine system to actually limit the rotational speed of the rotor. This is conventionally done through pitch control or by stall of the blades. Stalling of the blades inherently increases the turbine noise over the already loud noise from the high tip speed ratio. In contrast, the small wind turbine system operates with a low tip speed ratio and in high winds, the rotor does not stall and is allowed to accelerate, eliminating any stall induced noise.

Figure 8:
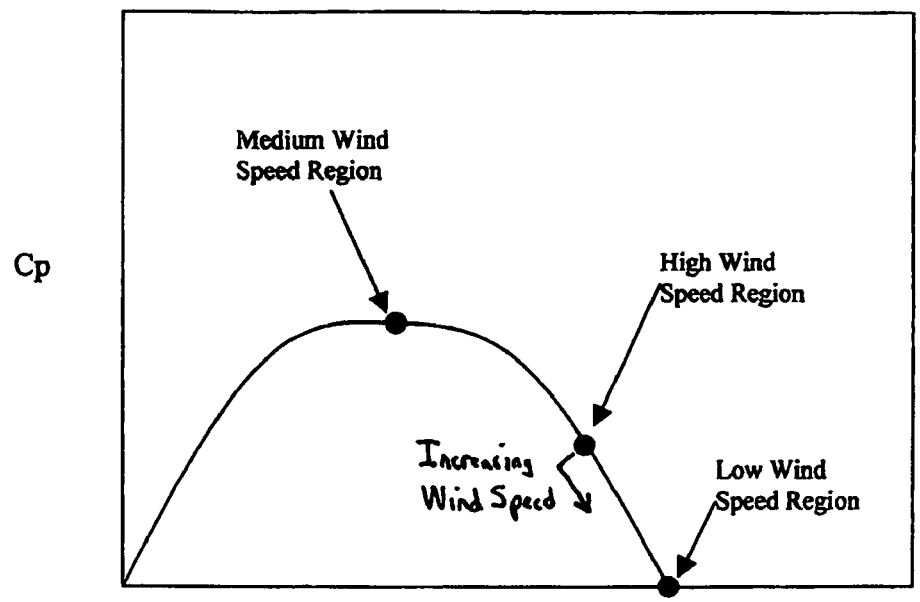
FIG. 8 is a plot showing the operating power coefficients for a wind turbine in a small wind turbine system in accordance with the invention.

A plot showing the operating power coefficients for a wind turbine in a small wind turbine system in accordance with the invention is shown in FIG. 8. In the low wind speed region, the rotor operates at its no load maximum tip speed ratio. No load is applied to the generator by the power converter. In the medium wind speed region, the power converter applies a nonlinear increasing load to the generator in accordance to the generator speed, based on the generator and rotor design parameters. The applied load maintains the rotor operating tip speed ratio at the tip speed ratio corresponding to near the maximum rotor power coefficient. In the high wind speed region, the power converter applies a decreasing load to the generator that increases the rotor operating tip speed ratio above the operating tip speed ratio in the medium wind speed region. The effect is that the rotor speed is yet further increased as the speed of the wind increases. This is in contrast with and is the opposite of convention small wind turbines wherein the rotor speed is reduced by reducing the operating tip speed ratio in high winds.

Figure 9:
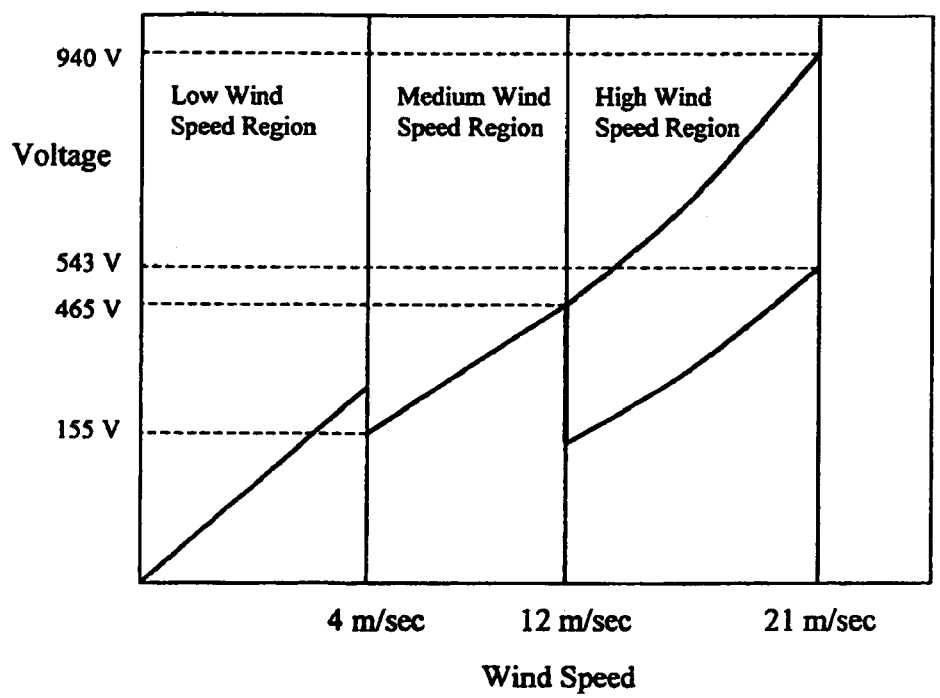
FIG. 9 is a plot of voltage versus wind speed for a small wind turbine system in accordance with the invention.

The voltage of the generator per wind speed can be utilized to further reduce the costs of the small wind turbine system. At any given power level, high voltage operation reduces the current and hence the wiring costs for connecting the wind turbine to the power converter, if mounted separately. In addition, the power converter design can be significantly simplified, efficiency increased and costs reduced through elimination of a boosting stage. The generator preferably is designed to produce an output voltage high enough for the rotor rotational speed at the transition to the medium wind speed region such that it does not require boosting to produce the AC power to the grid. A plot of generator output voltage versus wind speed for a small wind turbine system in accordance with the invention is shown in FIG. 9. At 4 m/sec, the rectified generator voltage is 155 volts, which is above the 110 volts of the AC power system grid. As the wind speed increases, the generator voltage increases linearly. At the 12 m/sec transition to the high wind speed region, the generator voltage is 465 volts. As the wind speed continues to increase in the high wind speed region, the slope of the voltage with wind speed increases nonlinearly because the operating tip speed ratio is not held constant and is instead increased by the power converter. At 21 m/sec, the voltage increases to 940 volts. Alternatively, a wye to delta converter can switch the generator windings connection and lower the output voltage to 543 volts at 21 m/sec. Depending on the wind speed regime of the installation location, the maximum wind speed set in the high wind speed region of a digital signal processor 69 can altered or reduced to limit the output voltage.

Figure 10:
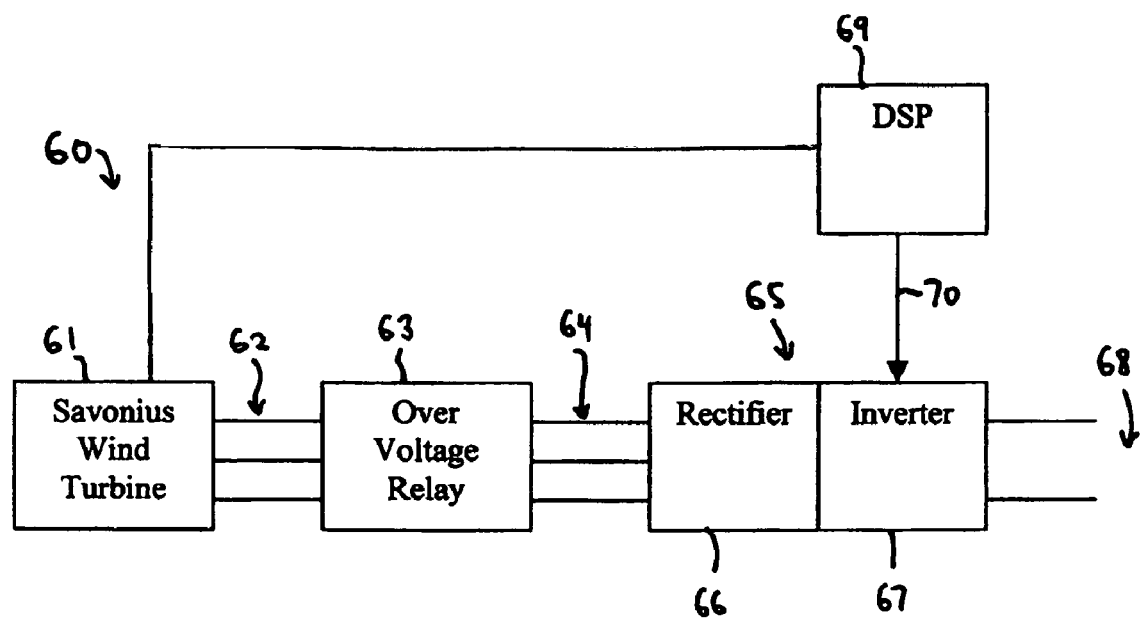
FIG. 10 is a schematic drawing of a power system for use in a small wind turbine system in accordance with the invention.

A schematic drawing of a power system for use in a small wind turbine system in accordance with the invention is shown in FIG. 10. The wind turbine system 60 comprises a Savonius wind turbine 61, such as the wind turbine 30 shown in FIGS. 1A and 1B, with a permanent magnet generator that provides generator power via lines 62 to an over voltage protection relay 63. The relay 63 disconnects the generator power in extreme wind speeds that would cause damage to the rest of the small wind turbine system. The transmitted generator power is supplied via lines 64 to a power converter 65 that converts generator power to regulated AC power in lines 68 for grid tie connection. The power converter 65 can utilize a matrix or cycloconverter topology. In a more simple alternative, the power converter 65 is constructed of a rectifier 66 that converts the generator power to DC and an inverter 67 that produces the regulated AC output 68. The inverter 67 is controlled by a digital signal processor 69 utilizing information about the output of the generator in the turbine 61 via a line 71. The digital signal processor 69 controls the firing of the inverter switches to apply the load to the generator power 64 according to wind speed. A suitable programmable digital signal processor (DSP) for this application would be the Texas Instruments TMS320C2000 Digital Signal Controller.

Figure 11:
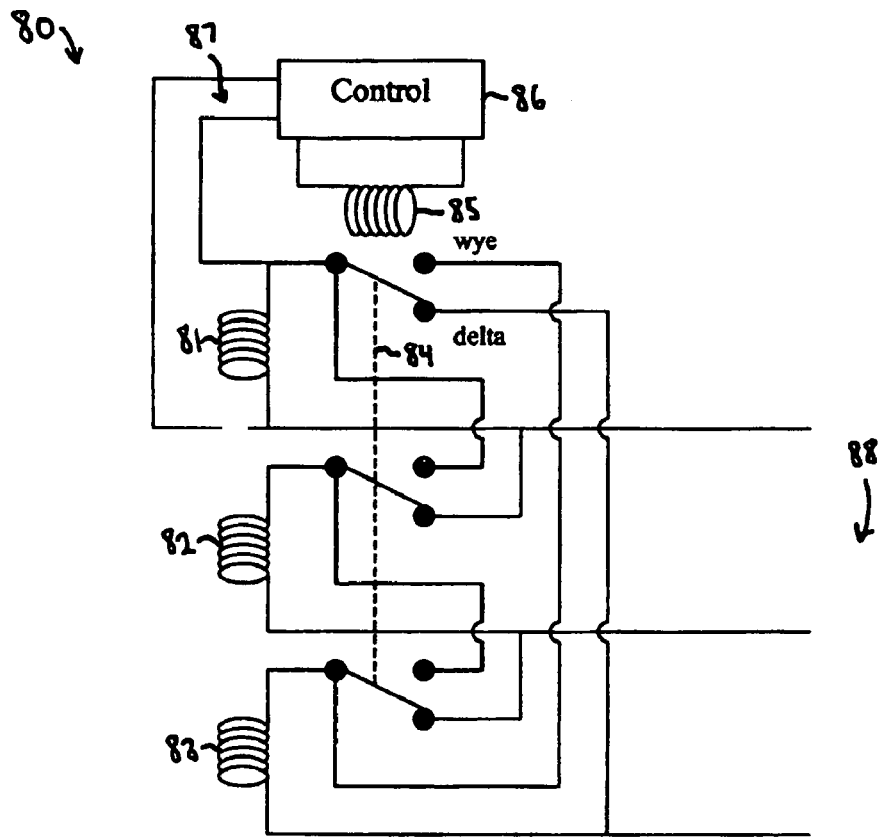
FIG. 11 is a schematic diagram of a wye to delta generator control for use in a small wind turbine system in accordance with the invention.

To limit the voltage from the generator, it is sometimes advantageous to utilize a wye to delta control for the generator output. A schematic diagram of a wye to delta generator control for use in a small wind turbine system in accordance with the invention is shown in FIG. 11. The control 80 comprises the three phase generator windings 81, 82, 83 that provide the generator power supplied by the rotor rotation. The windings 81, 82, 83 are switched by a relay 84 between wye and delta three phase connection. A controller 86, based on a phase voltage or frequency measurement sensed in the lines 87 from the generator, operates the coil 85 of the relay 84. When the generator phase leg winding voltage achieves a threshold, the connection is switched from a wye to a delta, resulting in a 1.73 times voltage drop. As the rotor speed continues to increase from increasing wind speed, the generator output 88 remains reduced by 1.73 times. This limits the voltage requirements for the interconnection cabling with the power converter.

Figure 12:
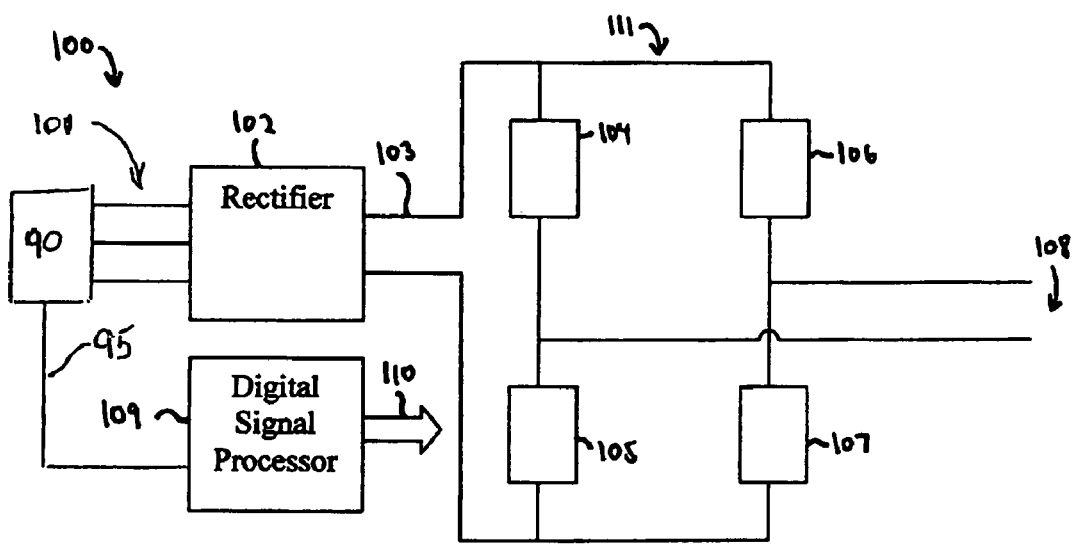
FIG. 12 is a schematic diagram of an inverter for use in a small wind turbine system in accordance with the invention.

Inverters have been designed with many different topologies depending on the desired operational conditions, performance and costs. A preferred inverter construction for the wind turbine system is one that does not require voltage boosting. This can reduce size and costs and can eliminate the need for a step up transformer. A schematic diagram of a power converter for use in a small wind turbine system in accordance with the invention is shown in FIG. 12. The power converter 100 receives generator input power from the generator 90 via lines 101. Generator power is rectified by a rectifier 102 to provide unregulated DC power via lines 103. The unregulated DC power is inverted to output regulated AC grid tie power 108 by an H-bridge inverter block 111. The H bridge 111 includes four transistors (typically IGBT's) 104, 105, 106, 107 that switch the DC power from lines 103. A control or digital signal processor 109 (corresponding to the DSP 69 in FIG. 10) utilizes input information via a line 95 about the generator output power, e.g output voltage or frequency, and provides a control signal 110 to the transistors 104-106 to both regulate the load applied back to the generator power via lines 101 and to provide synchronized output AC power 108.

The drag propelled wind turbine for use in the small wind turbine system can utilize different constructions so long as it is self starting, rotates about a vertical axis and operates without pitch control for limiting the operating speed. A preferable construction is a modified Savonius construction utilizing higher efficiency rotor blade shapes to utilize some lift force. A tall rotor increases the energy capture and allows for reduced diameter to increase the rotational rate and reduce the generator costs. A schematic elevation of the top end of a wind turbine in a small wind turbine system in accordance with the invention is shown in FIG. 13. The wind turbine 120 is comprised of a stationary center pole shaft 121. The rotor 129 rotates about the center shaft 121 and is journalled by an upper end bearing 123 that is fixed upon a small shaft end 124. The bearing 123 is held in an upper rotor end plate 122. Vertical rigid blade support tubes 125, 126, 127, 128 are affixed to the upper rotor end plate 122. Blades (not shown for simplicity) are attached between each of the vertical blade support tubes 125, 126, 127, 128.

The wind turbine utilizes a permanent magnet generator to convert the turbine rotor rotational energy into electrical power. It is desirable to place the generator at the lower end of the wind turbine so that its weight is closer to the ground. A schematic drawing of the bottom end of a wind turbine 140 in a small wind turbine system in accordance with the invention is shown in FIG. 14. This wind turbine 140 could use as its upper end the upper end shown in FIG. 13, or could use a different upper end. The wind turbine 140 has comprised a stationary center pole shaft 141 and a rotor 155 that rotates about the shaft 141. The rotor 155 is journalled by a lower bearing 146, which is attached to a center mounting tube 144. The mounting tube 144 is clamped onto the center pole 141 by a clamping nut 145. The bearing 146 is affixed to the generator 143 through an upper back iron 147. The generator 143 is constructed of upper and lower back irons 147, 148 with vertically aligned circumferential arrays of magnets 150, 151 of alternating polarity. The magnets 150, 151 drive magnetic flux across an armature airgap 152. An air core armature 153 is located in the armature airgap 152 and attached to the center tube 144 for generation of electrical power. The power is removed by windings connections 154 to the air core armature 153. An outer tube 149 maintains the distance of the armature airgap 152.

The rotor 155 is constructed of a lower rotor end plate 142 that is bolted to the upper back iron 147. Vertical blade support tubes 155, 156, 157, 158 are attached to the lower rotor end plate 142 for mounting of the blades, not shown for simplicity. The blades are curved panels that are affixed between the vertical tubes 155, 156, 157, 158 to capture the energy from the wind and to drive the rotor 155 and generator 143.

A wind turbine that would be suitable for use with this invention is disclosed in more detail in a PCT Application entitle "Low Cost Wind Turbine" by Christopher W. Gabrys filed in the U.S. Receiving Office of the PCT concurrently herewith, the disclosure of which is incorporated by reference herein.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims, wherein

I claim:

1. A small wind turbine electricity generation system for generating and providing regulated AC electric power from a wind turbine to a power system grid, comprising:

a small wind turbine for producing less than 10 kW of peak electric power, said wind turbine including a rotor having a diameter and vane configuration such that said rotor rotates with a maximum tip speed ratio of less than 3.0 when not loaded;

a permanent magnet generator coupled to and driven by said wind turbine that produces generator power with a frequency that varies with the wind speed;

a power converter connected to said generator power that converts said generator power to said regulated AC electric power by applying a controlled load to said generator power, said power converter controls said load to said generator such that a) said power converter provides no power to said power system grid in a low wind speed region; b) said power converter provides power with a nonlinear increasing function of the turbine rotational speed in a medium wind speed region and in a high wind speed region; and c) said power converter provides output power by increasing the rotor operating tip speed ratio of said rotor above the operating tip speed ratio of said rotor in said medium wind speed region.

2. A small wind turbine electricity generation system as described in claim 1 wherein:

said power converter provides a substantially constant output power in said high wind speed region.

3. A small wind turbine electricity generation system as described in claim 1 wherein:

said power converter disconnects from said generator power in said high wind region and provides no power to said power system grid.

4. A small wind turbine electricity generation system as described in claim 1 wherein:

said power converter switches windings of said permanent magnet generator between a wye and delta configuration to limit the maximum voltage in said high wind region.

5. A small wind turbine electricity generation system as described in claim 1 wherein:

switching from said low wind speed region to said medium wind speed region occurs within a wind speed range between 3 to 6 m/sec and switching from said medium wind speed region to high wind speed region occurs within a wind speed range between 10 and 13 m/sec.

6. A small wind turbine electricity generation system as described in claim 1 wherein:

said generator power provides a rectified voltage that is greater than the peak voltage of said power system grid whenever said wind turbine is operating in said medium wind speed region.

7. A small wind turbine electricity generation system as described in claim 1 wherein said permanent magnet generator comprises:

two spaced apart generator rotors that are directly driven by said rotor at the same rotational speed as said rotor, and form an armature airgap between opposed faces of said generator rotors;

permanent magnets of said permanent magnet generator are located on one or both of said opposed faces of said generator rotors and drive magnetic flux across said armature airgap;

multiple generator windings in said armature airgap for producing power.

8. A small wind turbine electricity generation system for generating and providing electric power from a wind turbine to a power system, comprising:

a small wind turbine for producing less than 10 kW of peak electric power, said wind turbine having a rotor that uses drag for extracting some energy from wind;

said rotor drives a permanent magnet generator that produces generator power with a frequency that varies with the wind speed;

a power converter that applies a load to said permanent magnet generator and converts said generator power to electric power for said power system;

said power converter utilizes three operating regions including a low wind speed region, a medium wind speed region and a high wind speed region, wherein said power converter provides no power to said power system grid in the low wind speed region, said power converter provides power with an increasing function of the turbine rotational speed in said medium wind speed region and in said high wind speed region, said power converter provides output power by increasing the rotor operating tip speed ratio of said rotor above the tip speed ratio corresponding to the maximum power coefficient for said rotor.

9. A small wind turbine electricity generation system as described in claim 8 wherein:

said power converter provides a substantially constant output power in said high wind speed region.

10. A small wind turbine electricity generation system as described in claim 8 wherein:

said power converter disconnects from said generator power in said high wind region and provides no power to said power system.

11. A small wind turbine electricity generation system as described in claim 8 wherein:

said power converter switches the windings of said permanent magnet generator between a wye and delta configuration to limit the maximum voltage in said high wind region.

12. A small wind turbine electricity generation system as described in claim 8 wherein:

switching from said low wind speed region to said medium wind speed region occurs within a wind speed range between 3 to 6 m/sec and switching from said medium wind speed region to high wind speed region occurs within a wind speed range between 10 and 13 m/sec.

13. A small wind turbine electricity generation system as described in claim 8 wherein:

said generator power provides a rectified voltage that is greater than the peak voltage of said power system whenever said wind turbine is operating in said medium wind speed region.

14. A small wind turbine electricity generation system as described in claim 8 wherein said permanent magnet generator comprises:

two spaced apart generator rotors that are directly driven by said rotor at the same rotational speed as said rotor, and form an armature airgap between opposed faces of said generator rotors;

permanent magnets of said permanent magnet generator are located on one or both of said opposed faces of said generator rotors and drive magnetic flux across said armature airgap;

multiple generator windings in said armature airgap for producing power.

15. A small wind turbine electricity generation system for generating and providing grid-tied AC electric power from a wind turbine to a power system grid, comprising:

a small wind turbine for producing less than 10 kW of peak electric power, said wind turbine having a cross-wind rotor;

said wind turbine drives a permanent magnet generator that produces generator power with a frequency that varies with the wind speed;

a power converter that converts said generator power to said regulated AC electric power by applying a controlled load to said generator power;

said power converter utilizes three operating regions including a low wind speed region, a medium wind speed region and a high wind speed region, wherein said power converter provides no power to said power system grid in the low wind speed region, said power converter provides power with a nonlinear increasing function of the turbine rotational speed in said medium wind speed region and in said high wind speed region, said power converter applies loads to said generator power that increase the rotor operating tip speed ratio of said rotor with increasing wind speeds.

16. A small wind turbine electricity generation system as described in claim 15 wherein:

said power converter switches the windings of said permanent magnet generator between a wye and delta configuration to limit the maximum voltage in said high wind region.

17. A small wind turbine electricity generation system as described in claim 15 wherein:

said power converter disconnects from said generator power in said high wind region and provides no power to said power system grid.

18. A small wind turbine electricity generation system as described in claim 15 wherein:

said power converter includes an inverter that is controlled by a digital signal processor that controls the firing of switches in said inverter to apply said controlled load to said generator power according to wind speed.

19. A small wind turbine electricity generation system as described in claim 15 wherein:

said generator power provides a rectified voltage that is greater than the peak voltage of said power system grid whenever said wind turbine is operating in said medium wind speed region.

20. A small wind turbine electricity generation system as described in claim 15 wherein said permanent magnet generator comprises:

two spaced apart generator rotors that are directly driven by said rotor at the same rotational speed as said rotor, and form an armature airgap between opposed faces of said generator rotors;

permanent magnets of said permanent magnet generator are located on one or both of said opposed faces of said generator rotors and drive magnetic flux across said armature airgap;

multiple generator windings in said armature airgap for producing power.

* * * * *